(12) United States Patent
Fernandez et al.

(10) Patent No.: US 6,993,130 B1
(45) Date of Patent: Jan. 31, 2006

(54) METHODS AND APPARATUS FOR MEDIAMETRIC DATA CRYPTOPROCESSING

(75) Inventors: Alberto Fernandez, Miami, FL (US); Carlos D. Bormey, Miami, FL (US); Ismael E. Negrin, Miami, FL (US)

(73) Assignee: XTec, Incorporated, Miami, FL (US)

( * ) Notice: Subject to any disclaimer, the term of this patent is extended or adjusted under 35 U.S.C. 154(b) by 0 days.

(21) Appl. No.: 09/562,336

(22) Filed: May 1, 2000

Related U.S. Application Data (60) Provisional application No. 60/180,372, filed on Feb. 4, 2000.

(51) Int. Cl.
| | |
|---|---|
| *H04L 9/00* | (2006.01) |
| *H04L 27/108* | (2006.01) |
| *G06F 11/30* | (2006.01) |
| *G06F 12/00* | (2006.01) |
| *G06F 17/60* | (2006.01) |

(52) U.S. Cl. .................. 380/46; 713/189; 713/193; 713/194; 713/172; 711/163; 711/170; 705/14; 257/296

(58) Field of Classification Search ............... 380/46; 713/193, 194, 189, 172; 711/163, 170; 257/296; 705/14

See application file for complete search history.

(56) References Cited

U.S. PATENT DOCUMENTS

| 5,644,636 A * | 7/1997 | Fernandez ............... 713/193 |
| 6,266,647 B1 * | 7/2001 | Fernandez ............... 705/14 |
| 6,566,699 B2 * | 5/2003 | Eitan ..................... 257/296 |
| 6,606,707 B1 * | 8/2003 | Hirota et al. ............ 713/172 |
| 6,611,907 B1 * | 8/2003 | Maeda et al. ............ 711/170 |

OTHER PUBLICATIONS

XTec: "Mediametrics Technology Securing the 21st Century": copyright 1999, http://www.xtec.com/home.html, pp. 1-6.*
Trademark Electronic Search System (TESS): Feb. 12, 1997, http://tess2.uspto.gov, pp. 1-2.*
Microchip: Press Release—Alliance Revolutionizes Security for Financial Transactions, Electronics Commerce, Data Communications; Oct. 12, 1998, http://www.microchip.com, pp. 1-3.*
XTec: Mediametrics Technology Securing the 21st Century: copyright 1999, http://www.xtec.com/home.html.*
Trademark Electronic Search System (TESS): http:tess2.uspto.gov, Feb. 12, 1997, pp. 1-2.*

* cited by examiner

*Primary Examiner*—Matthew Smithers
*Assistant Examiner*—Courtney Fields
(74) *Attorney, Agent, or Firm*—Priest & Goldstein (57) ABSTRACT

A data storage device having mediametric properties used as a source of data for cryptoprocessing keys. A memory array is formed by a plurality of memory cells, each cell containing a level of trapped charges that are difficult or impossible to set to a specific value, but which may be read relatively precisely. The levels of trapped charges are read from selected cells. Data relating to the level of the trapped charges is used to produce the cryptoprocessing keys. In addition, data relating to the charge levels in a memory array is used in generation of random numbers. When a random number is desired, data is written to selected cells of the memory array in order to establish random charge levels in the cells. The data is then read from the selected cells and processed to yield a random number.

22 Claims, 11 Drawing Sheets

METHODS AND APPARATUS FOR MEDIAMETRIC DATA CRYPTOPROCESSING

This application claims the benefit of U.S. Provisional application Ser. No. 60/180,372 filed Feb. 4, 2000.

FIELD OF THE INVENTION

The present invention relates generally to improvements to cryptoprocessing of information. More particularly, the invention relates to using physical properties of the media used to record the information as a source of data for use in the generation of encryption keys.

BACKGROUND OF THE INVENTION

Storage of financial and other information in solid-state devices such as semiconductor memory cards is growing more and more prevalent. Large quantities of data representing customer or merchant information, transaction histories, or stored value may be placed on a card and given to the customer. The information may be completely self-contained on the card, allowing the information to be read directly from the card. This approach is different from the use of magnetic cards, which typically contain only an account number or other identifying information, which is used as an index to retrieve the customer information from a database. A semiconductor memory card typically stores data in solid-state memory such as an EPROM or EEPROM. The card is placed in a card writer which provides information to the card in a numerical format and transfers the information through ports provided on the card. The card includes a microcomputer, which receives the information from the reader, processes the information, and stores the information in the memory. Similarly, whenever it is desired to use the information stored on the card, the microcomputer retrieves the information from memory, processes the information, and transfers the information through the ports to an external device such as a card reader. Because high-capacity memory devices are widely available, it is possible to store large quantities of data on such a card, making it versatile and convenient.

After information is written to the semiconductor memory card, it can be given to a customer so that the customer can present the card for reading and writing of data as needed. For example, a cash card may be loaded with information representing cash credits. The card is given to the customer and presented to a merchant or bank whenever a debit is to be made. Upon presentation of the card, the merchant or bank places the card in a reader/writer, reads the balance on the card, makes an appropriate subtraction, and writes the new balance to the card. The debit can be made without a need to retrieve any information other than the information on the card itself.

If a semiconductor memory card is to be given to a customer, security is vital. A customer in possession of a semiconductor memory card has long-term, unsupervised access to the card, and has the opportunity to attack the card at leisure in order to attempt to store unauthorized information on the card or to recover secret information from the card. It is possible for a skilled attacker to retrieve numerical information from a semiconductor memory card through probing of the internal components of the device, or through other unauthorized means. If card security is provided only through numerical means, such as numerical authenticators or cryptoprocessing keys, it is possible to retrieve the information from the card and to obtain information intended to be secret, or to create a counterfeit card which contains information duplicated from a legitimate card.

Mediametric techniques offer considerable advantages in providing data security. These mediametric techniques provide security through the use of data related to physical characteristics of the storage media. Mediametric data is data relating to physical properties of a medium in or on which data that is to be secured or authenticated is stored. As is apparent from the further discussion below, a particular medium on which data is stored frequently has properties that can be measured precisely in order to identify the medium, or to identify an instance of storage of genuine data in or on the medium. In addition, an instance of storage of data in or on the medium creates properties characterizing the particular instance of storage of data, and these properties can be measured precisely. However, certain specific properties of a medium frequently cannot be duplicated. If these are measured at the time of storage of data in or on a medium and the data relating to these properties are used for security or authentication, any attempted counterfeiting of a medium or alteration of data on a medium will fail because the properties of the authentic medium or instance of data storage will not be duplicated. Mediametric properties are these properties of a medium, or an instance of writing data to a medium, that can be measured but are difficult to duplicate and therefore are suitable for use in securing data. Mediametric data are data derived from mediametric properties of a medium or an instance of writing data to a medium and useful for authenticating or securing the medium or an instance of writing of data to the medium.

Solid state media possess characteristics which are impossible to duplicate precisely, but which can be precisely measured. These include, for example, variations in the remnant charge of EEPROM's, or variations in row/column addressing circuits. These and other characteristics have been used for authentication. A numerical representation, or fingerprint, of authenticating characteristics is created and stored. When the card is presented, the authenticating characteristics are measured, and a fingerprint is created and compared against the original fingerprint. Such techniques are described in detail in Fernandez U.S. Pat. No. 5,644,636, which is assigned to the assignee of the present invention and incorporated in its entirety herein by reference.

One advantage of such mediametric techniques is that some solid-state devices possess characteristics which will be altered by any tampering with the device. This may be true even when tampering with the device will succeed in revealing the numerical data stored in the device.

For example, it is possible to disassemble an EPROM or EEPROM memory and determine the numerical contents of memory cells through the use of a probe. However, it is not possible to read the precise levels of charges through such probing, as the use of the probe will alter the levels of the charges. It is possible for a memory to supply charge level data if suitable ports are supplied for the purpose, but if no external access to the ports is given, determination of the charge levels is difficult or impossible.

In systems of the prior art, mediametric techniques have been used for authentication and not to secure secret data. A prior-art mediametric card can be made secure against counterfeiting. For example, after a card is to be programmed with data, a "fingerprint" is generated, consisting of numerical representations of levels of trapped charges in selected memory cells. The fingerprint is then provided to an external device and stored. When the card is to be used again, the fingerprint is read from the card and compared against the stored fingerprint before the card is accepted as authentic.

In a typical approach of the prior art, data to be securely stored may be encrypted using numerical encryption techniques. If the encryption keys are stored in the memory in numerical form, they are vulnerable to unauthorized recovery. An attacker may simply probe the memory to extract numerical information from any desired location within the memory, in a search for the keys. Once the keys are identified, the attacker can simply decrypt the data.

There exists, therefore, a need for techniques for securing of secret data which provide enhanced resistance to attack.

SUMMARY OF THE INVENTION

To this end, as discussed in greater detail below, a mediametric technique is provided to advantageously enhance resistance to attack of semiconductor memory card data. In one respect, a data storage device according to the present invention may suitably be embodied as a semiconductor memory card. The semiconductor memory card includes a memory array such as that of an EPROM or EEPROM, which can be read by a microcontroller residing on the card. The memory array comprises a plurality of memory cells, each of which is characterized by a charge level. Each cell contains a representation of a binary digit in the form of a level of charge, which may be a "high" level of charge for a binary "1" and a "low" level of charge for a binary zero. The "high" and "low" levels of charge differ widely, making it easy to distinguish between a "1" and a "0". Programming a cell involves placing a high or low level of charge in the cell, depending on whether a "1" or a "0" is desired. It is not possible to set the level of charge precisely, but once the level of charge has been established it may be precisely measured.

The microcontroller can read the levels of charge, but in order for this information to be accessible outside the semiconductor memory card, the microcontroller must pass it outside the card. Therefore, if the microcontroller is designed or programmed to protect this information, it can be used inside the semiconductor memory card, but cannot be obtained or known outside the internal workings of the semiconductor memory card. This is because any attempt to open the memory array and read the memory contents will disrupt the levels of charge within the memory cells. The binary representations of data can be read in this way, but the act of reading will disrupt the charge levels.

It is therefore possible for the microcontroller to generate an internal encryption key, or alternatively a seed for an encryption key, using data representing charge levels of selected cells of the memory array. The encryption key generated from this data can be held within the microcontroller, without ever being released outside the microcontroller. Alternatively, the key may simply be generated when needed and erased after each use. The key provides very good security against compromise, because any attempt to obtain the charge levels will fail.

It is also possible to produce data for use in generating encryption keys by writing data to selected cells using an abnormally low writing voltage. The use of an abnormally low writing voltage produces unpredictable "high" and "low" levels in the memory cells in which this technique is used. Moreover, the "high" and "low" levels do not vary widely, so that it is difficult to distinguish a cell containing a "0" written using this technique from a cell containing a "1" by attacks such as probing the cells.

In order to secure data for storage on a semiconductor memory card according to the present invention, the data is encrypted using any of a number of standard encryption techniques. The particular technique employed is a matter of design choice, and does not affect the operation of the present invention. The encrypted data is written to the semiconductor memory card. The encryption key used to encrypt the data, referred to here as the external key, is also provided to the semiconductor memory card, preferably by providing the key to the microcontroller. After being provided to the semiconductor memory card, the external key is itself encrypted, using an internal key generated according to the techniques of the present invention.

The internal key is generated using data from the memory array. The microcontroller retrieves the data from selected cells within the memory array. If the data used is charge level data, it is converted from analog to digital form in order to be operated on by the microcontroller. The charge level data need not be stored in numerical form, but can simply be retrieved from the memory array whenever it is needed. This secures the charge level data from being discovered, and therefore prevents discovery of the internal key. Similarly, if the encryption key has been generated by writing to cells using an abnormally low writing voltage, the data thus written is available to regenerate an encryption key whenever needed.

Once the data has been retrieved, the microcontroller uses it to encrypt or decrypt the external key. This may be done by using the charge level data to generate an internal key, or alternatively to generate a seed for an internal key. Once the internal key has been generated, it is then used for cryptoprocessing of the external key. After the external key has been provided to the microcontroller and encrypted, it can then be stored in the memory array. When data is to be stored on the semiconductor memory card, the external key can be retrieved, decrypted using the internal key, and used to encrypt the data for storage on the card. Once the data is stored, it is secure. It is encrypted using the external key, but the external key is stored on the card in encrypted format. The internal key cannot be retrieved in order to encrypt the external key, because the internal key is not stored in numerical form. Instead, it is simply obtained whenever needed by examining the physical properties of the cells of the memory array, and these properties cannot be known outside the card.

A more complete understanding of the present invention, as well as further features and advantages of the invention, will be apparent from the following Detailed Description and the accompanying drawings.

DETAILED DESCRIPTION

Figure 1:
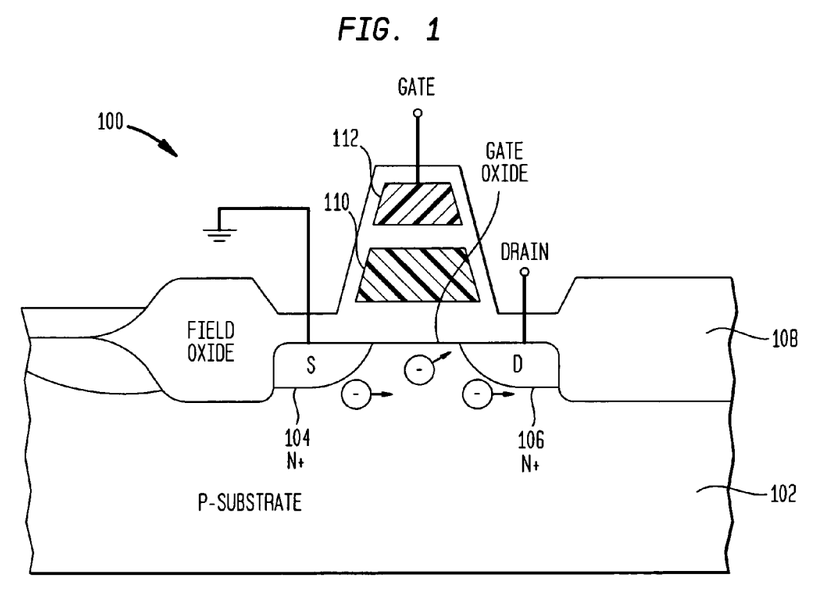
FIG. 1 illustrates an exemplary memory cell used in a data storage device according to the present invention.

FIG. 1 illustrates a memory cell 100 which may be advantageously employed according to the teachings of the present invention. The memory cell 100 may comprise a transistor integrated on a p-type substrate 102. The transistor comprises a source (S) 104 and a drain (D) 106 which are fabricated using well known techniques by the diffusion of N+ impurities on the substrate 102. The transistor includes a field oxide layer 108 that overlays the source 104 and the drain 106, and a floating gate 110 fabricated from a first layer of polysilicon that overlays the oxide layer 108. The transistor further comprises a gate 112 fabricated from a second layer of polysilicon that overlays the floating gate 110. Data may be programmed in the memory cell 100 for purposes of data storage according to the well known technique of floating-gate charge injection. For example, a potential which is typically greater than 12 volts is applied to the drain 106 to create a strong electric field that energizes electrons to jump from the drain 106 region to the floating gate 110 region. The electrons attracted to the floating gate 110 become trapped in the floating gate 110 when the potential is removed from the drain 106. When charges are trapped in the floating gate 110, the threshold of the memory cell 100 changes from a relatively low value, which is associated with the memory cell 100 when no charge or a small charge is present and is called an erased condition, to a higher value, which indicates that programming of the memory cell 100 has occurred. If a low voltage potential for programming a logic level low or "0" in the memory cell 100 is applied to the gate 112, then electrons are not attracted to the floating gate 110, and thus the floating gate 110 remains uncharged. On the other hand, if a high voltage potential for programming a logic level high or "1" is applied to the gate 112, then a large number of electrons will be attracted to the floating gate 18, thereby charging the floating gate 110.

It is well known to one of skill in the art that typical voltages for programming high and low logic levels depend upon the type and design of the semiconductor memory device being used. The level of charges that will be trapped in the memory cell 100 as a result of programming depends upon the characteristics of the semiconductor material and the geometry of the structures in the memory cell 100. For instance, variations in doping levels and dopant purities and the thickness of doped regions of a semiconductor substrate will cause inherent random variations in the level of charges that are trapped in a memory cell when a specific voltage level is applied for a specified amount of time during programming. These inherent random variations make reproduction or duplication of the same relative level of trapped charges in a second memory cell for purposes of obtaining an identical level of trapped charge in the second memory cell very difficult, if not impossible. The level of charges which will be trapped in a memory cell also depends on environmental conditions, such as temperature and the presence of stray static charges, existing at the time that the memory cell is programmed. In addition, the previous level of trapped charges for the memory cell and the total number of write cycles applied to the memory cell, known as the history of the memory cell, contribute to the level of charges trapped in the memory cell. Therefore, with each programming event the pattern of the trapped charges in memory cells of a memory array will vary in a manner which cannot be reproduced, even when the same memory cell is programmed with the identical data.

In an application such as a semiconductor memory card, it is possible to embed an array of memory cells such as the memory cell 100 into the card, and design the array with one or more ports by which the charge levels of the memory cells may be read by a device such as a microcontroller or microprocessor which is also embedded in the card. If the array and the card are designed such that no external access is allowed to the memory array, the charge level data will be very difficult or almost impossible to intercept. The binary contents of the memory cells such as the cell 100 can be intercepted from outside, because the digital representations of binary data have relatively wide tolerances. However, an attack which attempts to obtain the precise charge levels other than through the port will disrupt the charge levels, such that the attacker will be unable to recover the correct data. The present invention utilizes the inherent, unique and irreproducible variations in the level of trapped charges of each programmed memory cell such as the cell 100 to provide a substantial amount of unpredictable data, which remains stable between write cycles of each of the cells, but which is nearly immune from unauthorized access. This data can be used to generate encryption keys which are used exclusively by the semiconductor memory card and which are not known outside the semiconductor memory card.

Figure 2:
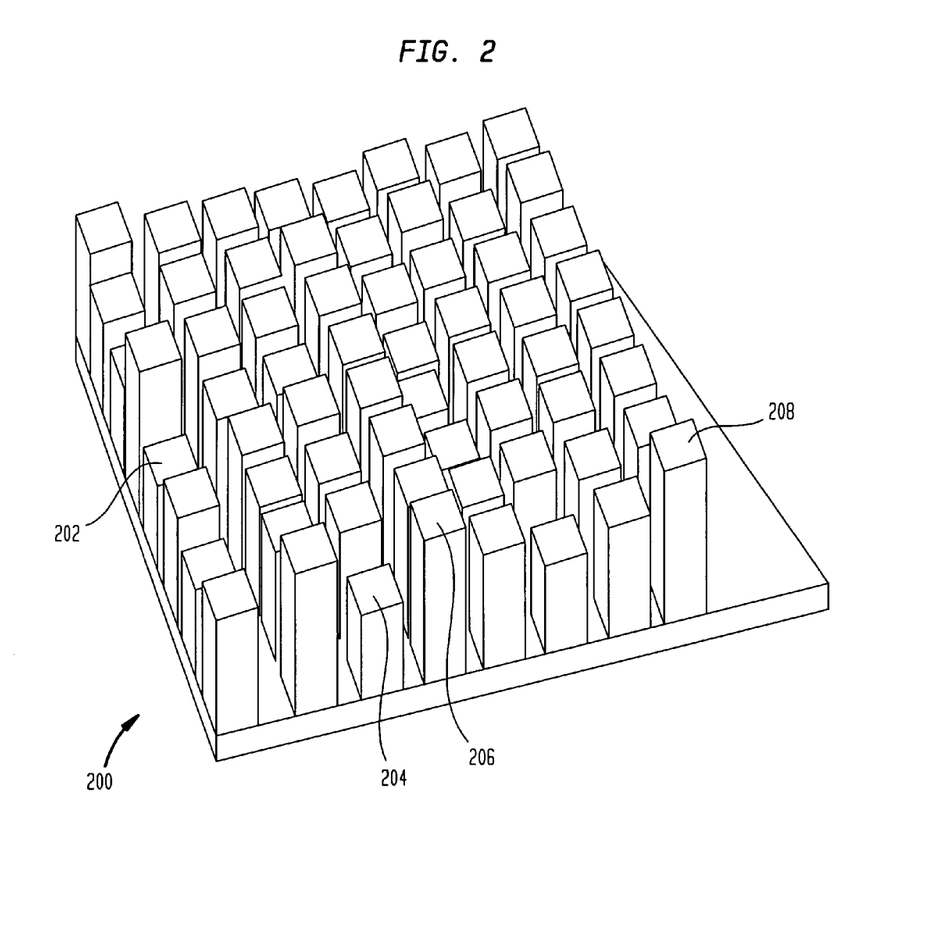
FIG. 2 is a graphical representation of differing charge levels prevailing in a memory array employed in a data storage device according to the present invention.

FIG. 2 is a graphical representation of differing charge levels prevailing in a memory array 200 which may be suitably employed in a data storage device according to the present invention. Charges are at either high or low states, but the high states are not identical to one another, and the low states are not identical to one another. Charge levels 202 and 204, for example, are both in a high state, but they are not identical. Similarly, charge levels 206 and 208 are both in a low state, but are not identical. In writing data to the array 200, it is a simple matter to set each memory cell at a charge level corresponding to a high or a low state, but it is not possible to specify the exact charge level of the memory cell. However, it is easy to read the charge level of each memory cell with great precision, provided that suitable connections are provided for this purpose.

Figure 3:
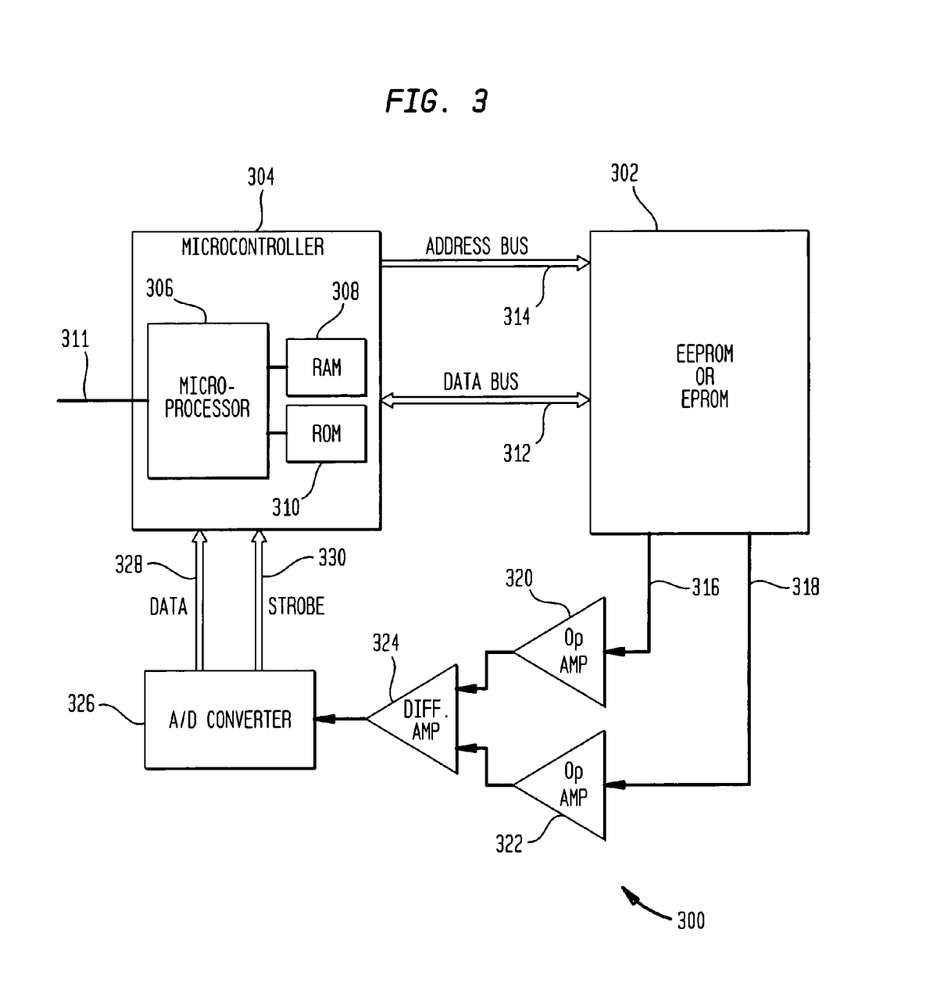
FIG. 3 illustrates a first data storage device according to the present invention including an EEPROM array, where parallel access is provided to the array.

FIG. 3 illustrates a data storage device 300 providing data security according to the principles of the present invention. The device 300 includes a memory array 302, which is here shown as an EEPROM comprising an array of memory cells similar to the cell 100 of FIG. 1. The array 302 is embodied here as an EEPROM because such devices typically include additional mechanisms, such as analog input and output lines for erasing or rewriting data to memory cells of memory arrays, that are useful for explaining the techniques and advantages of the present invention. A memory chip utilizing non-volatile floating-gate EEPROM cell technology has been developed by Information Storage Devices, and such a device may be used to practice the invention. However, it is to be understood that the memory array 302 may be any suitable device which comprises memory cells which are structurally and operationally similar to that of the memory cell 100 of FIG. 1, described above, and that most semiconductor memory devices may be adapted for use with this invention.

The storage device 300 also includes a microcontroller 304, which includes a microprocessor 306, RAM 308 and ROM 310. The microcontroller 304 also includes a data port 311 to allow transfer of data between the data storage device 300 and an external device. The data port 311 is connected to the microprocessor 306 and may suitably be a data bus.

It is also necessary to allow the microcontroller 304 to communicate with the memory array 302. An address bus 312 and data bus 314 enable transfer of numerical data between the microcontroller 304 and the array 302. In addition, first and second analog outputs 316 and 318 of the array 302 are used to provide access to charge level data of memory cells in the memory array 302, for use by the microcontroller 304.

In order to provide data security, the storage device 300 employs the charge level data describing charge levels of selected memory cells in the array 302. The first and second analog outputs 316 and 318 are used as inputs to first and second operational amplifiers 320 and 322. The outputs of the operational amplifiers 320 and 322 are provided as inputs of a differential amplifier 324. The output of the differential amplifier 324 is provided to an analog to digital (A/D) converter 326, which converts the analog data to digital data which can be processed by the microcontroller 304. The A/D converter 326 provides data to the microcontroller 304 by means of a data line 328. The microcontroller 302 is controlled so that it accepts data from the A/D converter by means of the application of a control signal or signals on a strobe line 330.

Whenever an internal key is needed for use by the microcontroller 304, the microcontroller 304 directs the memory array 302 to provide charge level data from selected cells. This data is provided through the analog outputs 316 and 318, conditioned by the operational amplifiers 320 and 322 and the differential amplifier 324, and converted to digital form by the A/D converter 326. The digital data representing the charge level data is then processed by the microcontroller 304. The microcontroller 304 uses this data to generate the internal key, which may then be used to encrypt an external key provided from outside the data storage device 300. The microcontroller 304 can then store the encrypted external key in the array 302. The external key, or any other data which is desired to be stored after retrieval of the charge data from which the internal key is generated, must be stored in memory cells other than the memory cells whose charge level data is used to generate the internal key. This is because the charge level in a cell changes whenever data is written to the cell. If data is written to the cell, therefore, the charge level of the cell will not be usable for reconstruction of the internal key.

It is possible to implement the various components of the storage device 300 on a single integrated circuit. This helps to provide security, as all connections except for the data port 311 would then be inside the integrated circuit.

Figure 4:
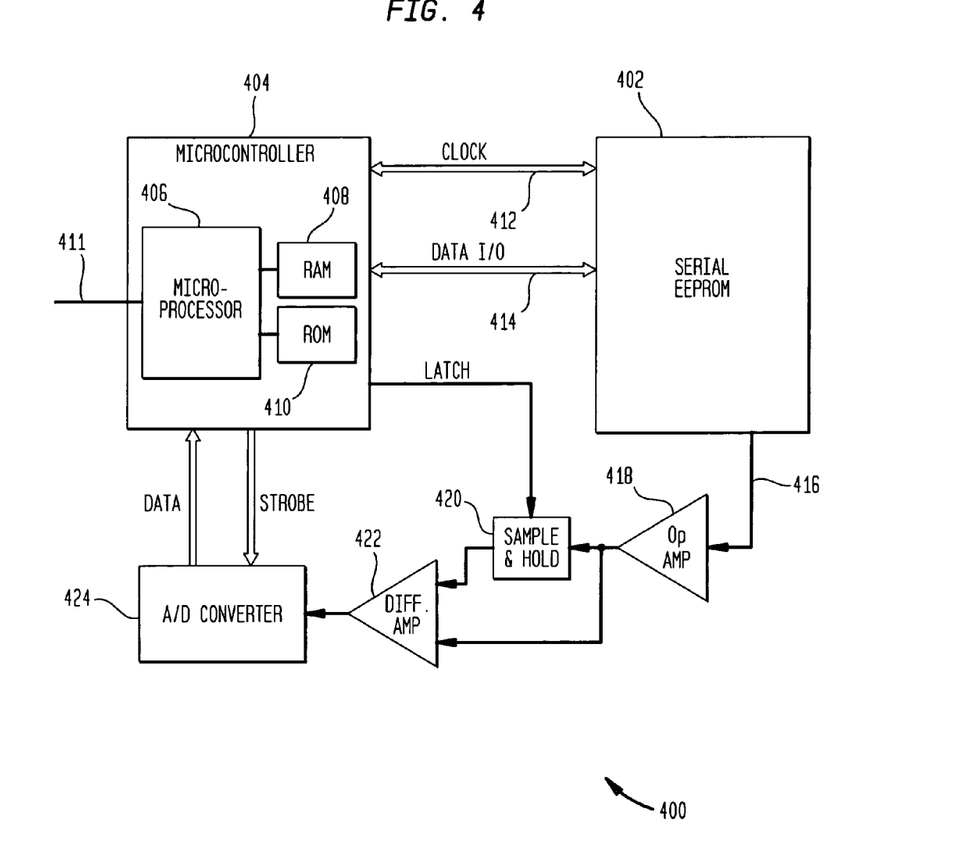
FIG. 4 illustrates a second data storage device according to the present invention including an EEPROM array, where parallel access is provided to the array.

FIG. 4 illustrates an alternative data storage device 400 according to the present invention, illustrating the use of mediametric data security techniques with serial memories. The device 400 employs a serial memory array 402. The memory array 402 may suitably be a serial EPROM or EEPROM. The memory array 402 is connected to a microcontroller 404, which includes a microprocessor 406, RAM 408 and ROM 410. The microcontroller 404 also includes a data port 411 to allow transfer of data between the data storage device 400 and an external device. The data port 411 is connected to the microprocessor 406 and may suitably be a data bus. The memory array 402 communicates with the microcontroller 404 using a clock line 412 and a data line 414. Each of the array 402 and the microcontroller 404 passes data to the other by placing data on the data line 414 one bit at a time and sending a clock input along the clock line for each bit. The memory array 402 also provides an analog output 416, which is used to provide charge level data to the microcontroller 404. The analog output is connected to an operational amplifier 418, which receives and processes mediametric data from the array 402, the mediametric data being charge level readings for levels of trapped charge in cells of the array 402. The operational amplifier 418 produces an output which is then used as an input to a sample and hold circuit 420 and a differential amplifier 422. The sample and hold circuit 420 passes its input to the differential amplifier 422 upon receiving a latch signal produced by the microcontroller 404. The output of the differential amplifier 422 is received by an analog to digital (A/D) converter 424, which converts the analog data representing charge levels of cells of array 402 into digital representations. The analog to digital converter 424 passes each digital representation to the microcontroller 404 upon receiving a strobe signal produced by the microcontroller 404. The data storage device 400 allows the microcontroller 404 to receive mediametric data relating to charge levels of memory cells in the memory array 402 and to use this data to generate cryptographic keys in a similar fashion to that discussed above for the microcontroller 304.

It is possible to implement the various components of the storage device 400 on a single integrated circuit. This single circuit implementation helps to provide security, as all connections except for the data port 411 would then be inside the integrated circuit.

Figure 5:
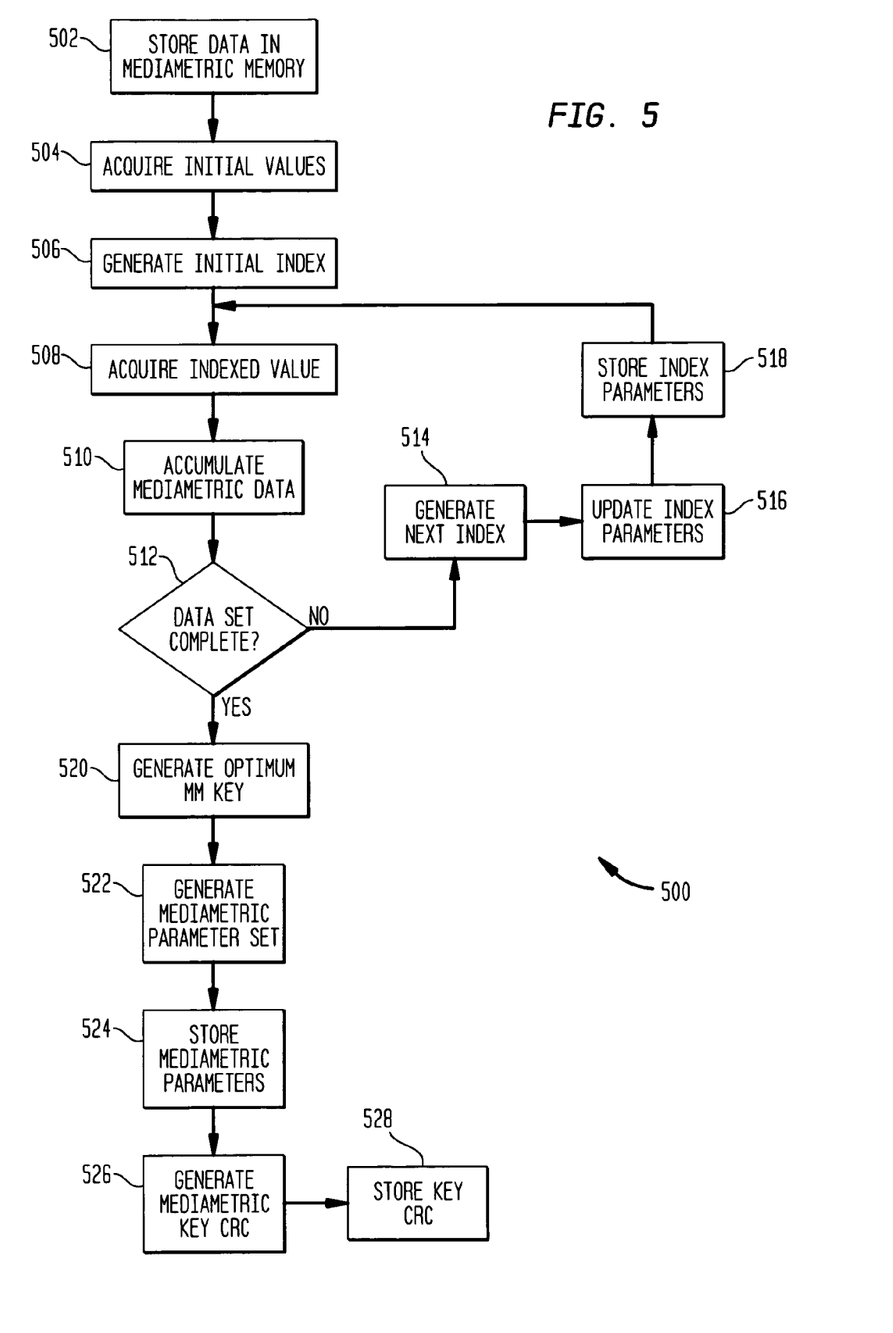
FIG. 5 illustrates a method of initialization in preparation for generation of a mediametric cryptoprocessing key according to the present invention.

FIG. 5 illustrates a method 500 of mediametric initialization in preparation for encryption, according to the present invention. At step 502, data is stored in a memory array having mediametric characteristics. The memory array possesses physical characteristics which are difficult or impossible to duplicate, but which can be precisely measured. The memory array may be an array such as the array 302 of FIG. 3, the array 402 of FIG. 4, or any other suitable memory array, wherein the mediametric characteristics are levels of charges trapped in the memory cells. Storage and retrieval of data to and from the memory array, and processing of data, is preferably accomplished by a data processing device such as the microcontroller 304 of FIG. 3, the microcontroller 404 of FIG. 4, or any other suitable data processing device. Storing the data establishes a set of mediametric data in the memory array, by setting a new charge level in each cell. At step 504, initial values are acquired. Next, a data set is collected. At step 506, an initial index is generated. This is an index pointing to a memory cell from which mediametric data, such as the level of trapped charges in the memory cell, is to be obtained. Next, at step 508, the mediametric value of the memory cell specified in the index is acquired. That is, the charge level or similar data is read and the mediametric data is suitably converted to a digital representation for easy storage and processing by a digital processor. At step 510, the mediametric value is accumulated. That is, it is stored, either individually or through summing or other processing with other mediametric values that have previously been recovered. Next at step 512, a determination is made as to whether the desired data set is complete. If the data set is not complete, the process continues to step 514, and a new index is generated in order to acquire data from an additional memory cell. Next, the process proceeds to step 516, and the set of index parameters, comprising all indices which have been generated, is updated. Next, at step 518, the set of index parameters is stored, and the process returns to step 508.

If the data set is complete, the process continues to step 520 and an optimum mediametric key is generated. Next, at step 522, a mediametric parameter set is generated. Next, at step 524, the mediametric parameter set is stored. Next, at step 526, a cyclic redundancy code (CRC) for the mediametric key is generated. Next, at step 528, the mediametric key CRC is stored.

Figure 6:
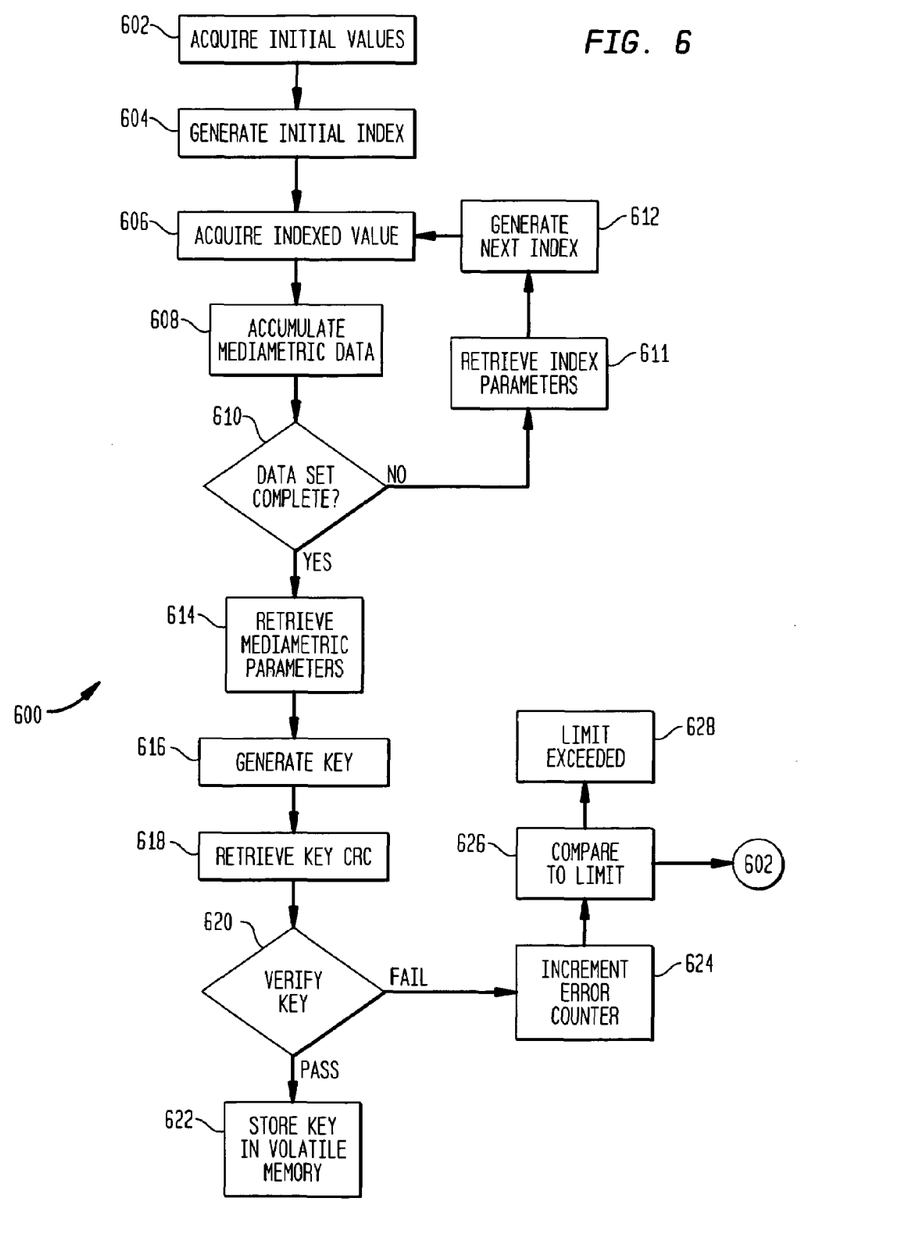
FIG. 6 illustrates a method of mediametric key generation according to the present invention.

FIG. 6 illustrates a method 600 of mediametric key generation according to the present invention. At step 602, initial values are acquired. The initial values are mediametric data obtained from a device. The device may suitably be a storage device such as the serial memory array 402 of FIG. 4 or the parallel memory array 302 of FIG. 3, and the mediametric data may suitably be values based on measures of levels of trapped charges within the memory array. Storage and retrieval of data to and from the memory array, and processing of data, is preferably accomplished by a data processing device such as the microcontroller 304 of FIG. 3, the microcontroller 404 of FIG. 4, or any other suitable data processing device. At step 604, an initial index is generated. This is a location within the array from which mediametric data is to be retrieved. Next, at step 606, the mediametric value at the array location indicated by the index is retrieved. Next, at step 608, the retrieved value is accumulated with all other previously retrieved values. Next, at step 610, a determination is made as to whether the data set is complete. If the data set is not complete, the process proceeds to step 611 and the previously stored index parameters are retrieved. Next, at step 612, the next index is generated. The process then returns to step 606.

If the data set is complete, the process continues to step 614 and the accumulated mediametric parameters are retrieved. Next, the process proceeds to step 616 and a key is generated using the accumulated mediametric parameters. Next, at step 618, the cyclic redundancy code associated with the key is retrieved. This is the cyclic redundancy code generated for the key during the process 500 of FIG. 5. Next, at step 620, the key is verified using the cyclic redundancy code. If the key passes the verification, the process proceeds to step 622 and the key is stored in a volatile memory, preferably within the data processing device. If the key does not pass verification, the process proceeds to step 624 and an error counter is incremented. Next, at step 626, the error counter is compared to a predetermined limit. If the limit is exceeded, the process proceeds to step 628 and an error is reported. If the error limit is not exceeded, the process returns to step 602 and a new attempt is made to generate a key.

Figure 7:
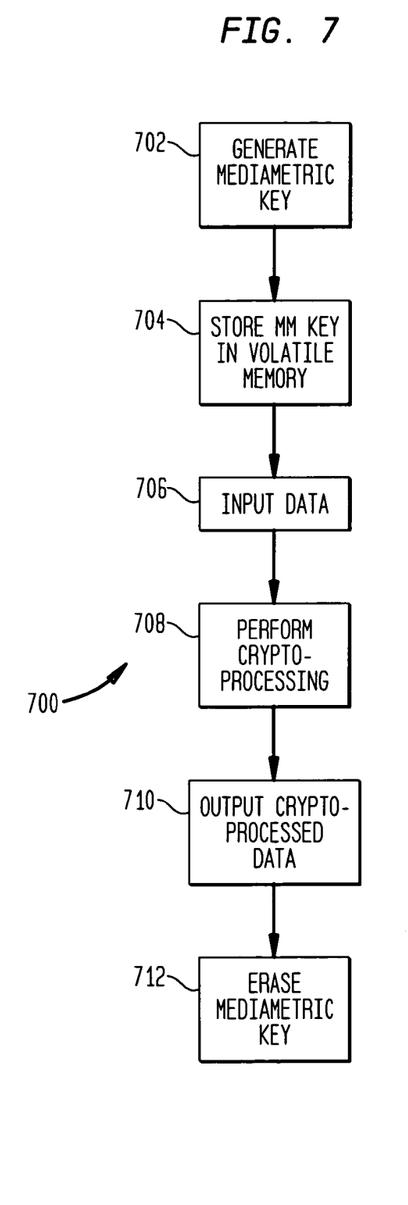
FIG. 7 illustrates a method of mediametric key cryptoprocessing according to the present invention.

FIG. 7 illustrates a method 700 of data encryption using a mediametric key such as the key generated by the method 600 of FIG. 6. At step 702, a mediametric key is generated. This may be done by performing the initialization method 500 of FIG. 5 and the key generation method 600 of FIG. 6. Next, at step 704, the mediametric key is stored in a volatile memory, preferably within the data processing device. Next, at step 706, data is retrieved from an outside source. Next, at step 708, the data is cryptoprocessed using the mediametric key generated at step 702. Next, at step 710, the cryptoprocessed data is output. For example, if the data has been encrypted, it may be output to a memory array for storage. An optional step 712 follows of erasing the mediametric key from the volatile memory. Erasing the mediametric key from the volatile memory accomplishes increased security, because if the key is erased it is not subject to be discovered by attacks such as probing. However, the mediametric data which was used to generate the key, but which is not subject to be discovered by attacks, is still available to regenerate the key when needed.

In addition to generating a mediametric key for use in cryptoprocessing, it is possible to use mediametric properties to generate useful data. For example, it may be very useful to be able to produce a truly random number. Genuinely random numbers are difficult to generate, especially with limited processing resources such as may be used in a semiconductor memory card. The use of mediametric properties simplifies random number generation. Charge levels in a memory array are randomly distributed, providing a conveniently accessible source of random data. If charge level data is obtained from a sequence of cells, the charge level data can be used to construct a random number.

Figure 8:
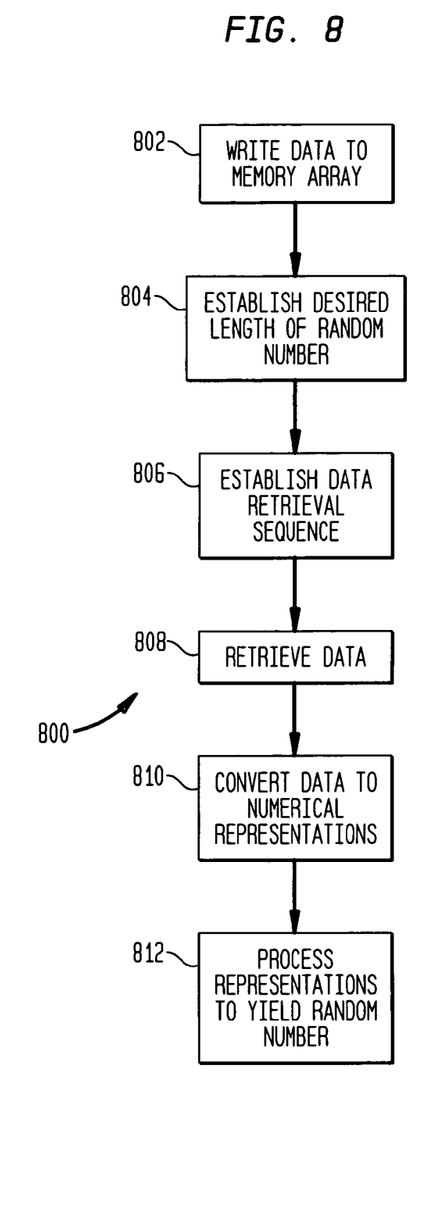
FIG. 8 illustrates a method of generating a random number using mediametric properties of a device.

FIG. 8 illustrates a method 800 of random number generation according to the present invention. At step 802, data is written to a memory array. The memory array may suitably be an EPROM or EEPROM such as the memory array 302 of FIG. 3, or the memory array 402 of FIG. 4. Writing the data to the array establishes a random pattern of charge levels in the cells of the memory array. At step 804, a desired length of a random number is established. At step 806, a sequence of cells is established from which charge level data is to be obtained. The number of cells in the sequence is sufficient to yield a number of the desired length. At step 808, memory charge level data is retrieved from each cell in the sequence. At step 810, the charge level data is converted to digital representations for processing. At step 812, the representations of the charge level data are processed to produce a random number.

Figure 9:
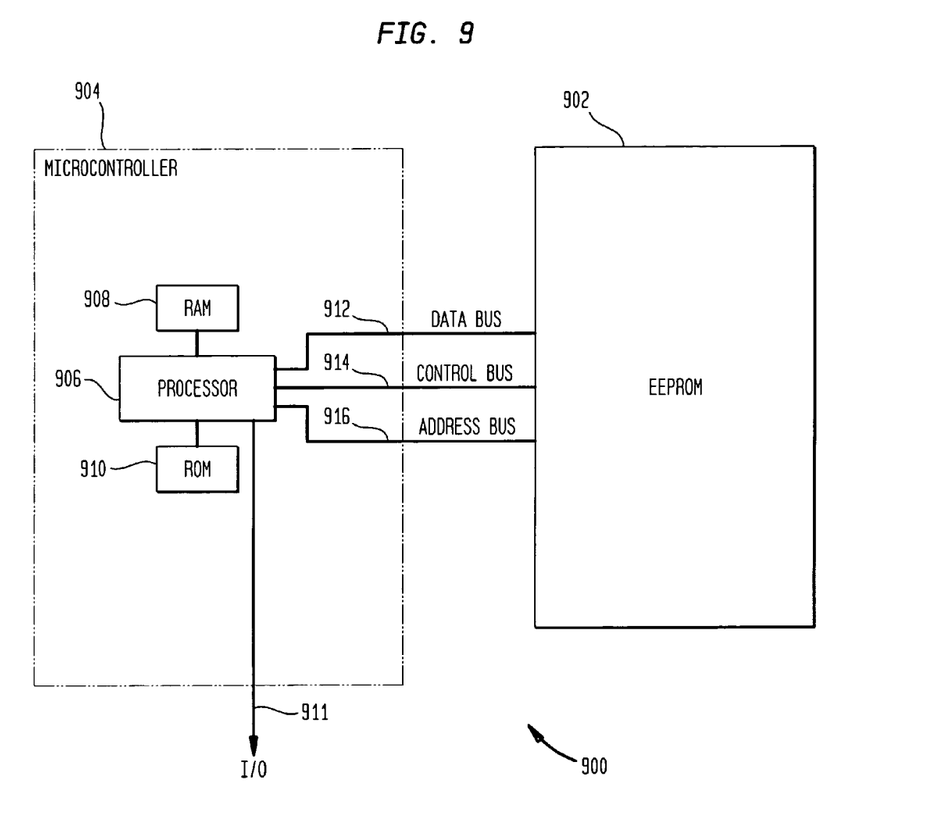
FIG. 9 illustrates a memory device adapted for encryption of data according to an alternative embodiment of the present invention.

It is possible to create a simplified data storage device which does not require determination of charge levels of cells of a memory array, by employing an alternative embodiment of the present invention. FIG. 9 illustrates an alternative data storage device 900 according to the present invention. The device 900 includes a memory array 902, which is here shown as an EEPROM comprising an array of memory cells similar to the cell 100 of FIG. 1.

The storage device 900 also includes a microcontroller 904, which includes a microprocessor 906, RAM 908 and ROM 910. The microcontroller 904 also includes a data port 911 to allow transfer of data between the data storage device 900 and an external device. The data port 911 is connected to the microprocessor 906 and may suitably be a data bus. It is also necessary to allow the microcontroller 904 to communicate with the memory array 902. An address bus 912 and data bus 914 enable transfer of numerical data between the microcontroller 904 and the array 902.

In order to provide additional data security, writing to selected cells of the memory array 902 may be accomplished by using a weaker than normal writing voltage. Normally, voltages on the order of 20 volts are used to write data to cells of a memory array. In accordance with one aspect of the present invention, selected cells of the memory array 902 are written using voltages on the order of 5 volts. This greatly reduces the levels of trapped charges within cells of the memory array 902, such that the levels of charges contained in the cells are not reliably translatable to numerical representations by conventional means. Because an insufficient writing voltage is employed to write data to the cells, a "1" may produce a level of charge typically representing a "0", or a "0" may produce a level of charge representing a "1". It is also possible for a "1" to be written as a "1" or a "0" as a "0". This is not predictable, and may change each time data is written to a cell using this technique. Moreover, because a lower voltage level is used to write the data, the charge levels which are trapped within the cells are much closer to the threshold level than is the case when data is written using a normal voltage level. When data is written to a memory cell using a typical writing voltage, the charge level representing a "0" may typically produce a voltage in the cell on the order of 0.5 volts. The charge level representing a "1" may produce a voltage on the order of 4.5 volts. If a voltage threshold of 3 volts is used to distinguish between a logical "0" and a logical "1", the voltages at memory cells which are written using a normal writing voltage will be substantially above or below the threshold and easily distinguished. However, if a lower than normal writing voltage is used to write data to the memory cells, the charge levels trapped within the cells will produce a voltage much closer to the threshold. For example, a cell written as a logical "1" may have a voltage of 3.1 volts and a cell written as a logical "0" may have a voltage of 2.9 volts. Alternatively, a cell written as a logical "0" may have a voltage of 3.1 volts and a cell written as a logical "0" may have a voltage of 3.1 volts. Not only may a cell be read as containing different digital data than was actually written, the data within the cell will be close to the threshold and difficult to identify by external means. Probing of a cell of a memory array will typically yield the information that the cell has a high or a low charge level, which can then be translated to a "1" or a "0". However, if the level of charges trapped within the cell is near the threshold, probing will not reliably identify the cell as containing a "1" or a "0". Therefore, writing data to selected cells of a memory array such as the array 902 will yield a source of random data which can be used for encryption keys, but which cannot be discovered by an attack.

Whenever an internal key is needed for use by the microcontroller 904, the microcontroller 904 writes data to selected cells of the memory array 902 using an insufficient writing voltage. The data read back is used to generate an internal key, which may then be used to encrypt an external key provided from outside the data storage device 900. The microcontroller 904 can then store the encrypted external key in the array 902. The external key, or any other data which is desired to be stored after retrieval of the charge data from which the internal key is generated, must be stored in memory cells other than the memory cells whose charge level data is used to generate the internal key. This is because the charge level in a cell changes whenever data is written to the cell. If data is written to the cell, therefore, the charge level of the cell will not be usable for reconstruction of the internal key.

It is possible to implement the various components of the storage device 900 on a single integrated circuit. This helps to provide security, as all connections except for the data port 911 would then be inside the integrated circuit.

Figure 10:
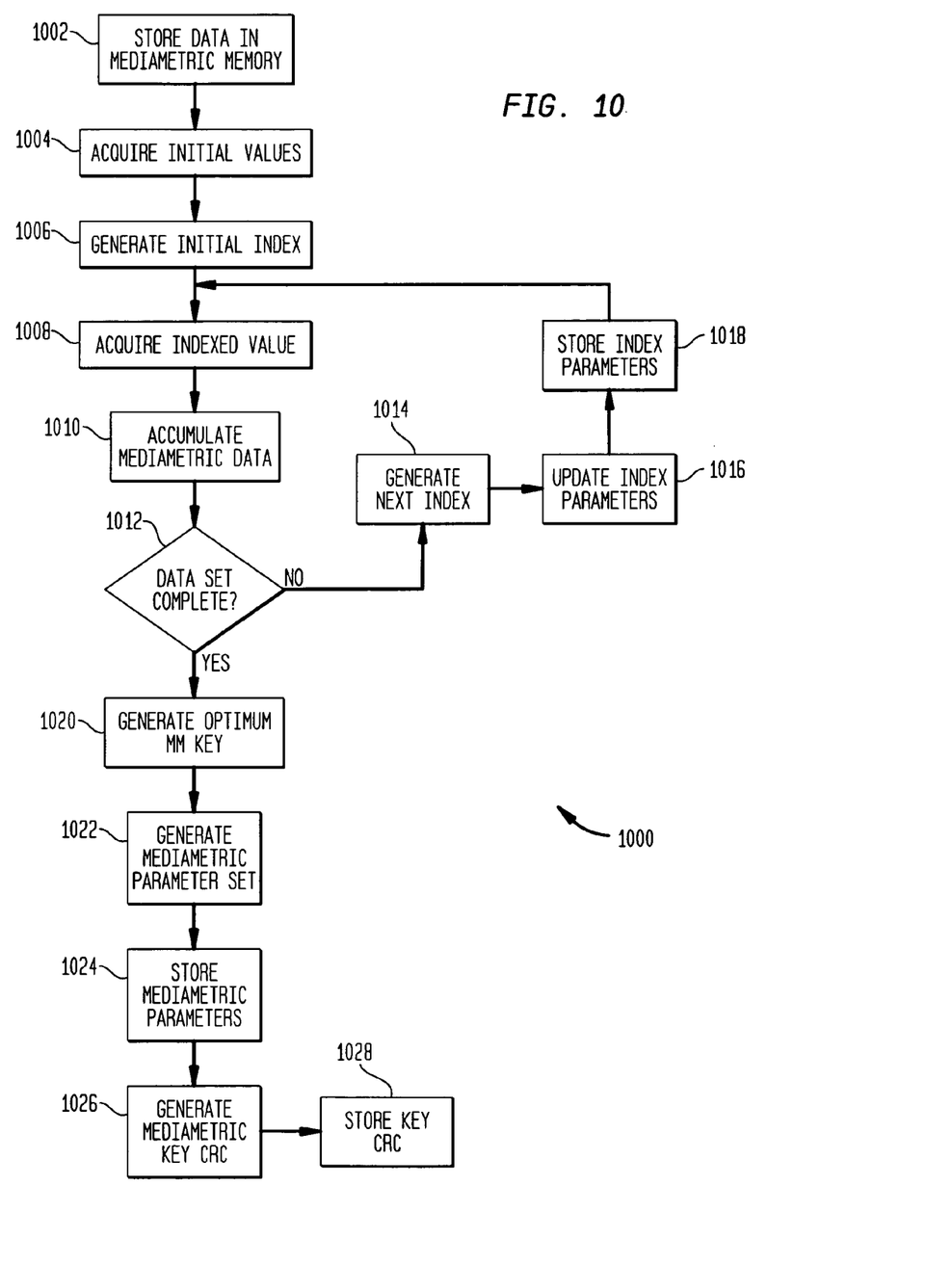
FIG. 10 illustrates a method of initialization in preparation for generation of a mediametric cryptoprocessing key according to an alternative embodiment of the present invention.

FIG. 10 illustrates a method 1000 of mediametric initialization in preparation for encryption, according to the present invention. At step 1002, data is stored in selected cells of a memory array, using an abnormally low writing voltage which produces unpredictable results. The memory array used may be an array such as the array 902 of FIG. 9, or any other suitable memory array, wherein data is represented by levels of charges trapped within memory cells. Storage and retrieval of data to and from the memory array, and processing of data, is preferably accomplished by a data processing device such as the microcontroller 904 of FIG. 9 or any other suitable data processing device. At step 1004, initial values are acquired by reading the data which was written using an abnormally low voltage and comparing the data read to the data that was written. Next, a data set is collected. At step 1006, an initial index is generated. This index points to a memory cell written using an abnormally low writing voltage. Next, at step 1008, the memory cell specified in the index is read. At step 1010, the value which was read is accumulated. That is, it is stored, either individually or through summing or other processing with other data that has previously been recovered. Next, at step 1012, a determination is made as to whether the desired data set is complete. If the data set is not complete, the process continues to step 1014, and a new index is generated in order to read an additional memory cell. Next, the process proceeds to step 1016, and the set of index parameters, comprising all indices which have been generated, is updated. Next, at step 1018, the set of index parameters is stored, and the process returns to step 1008. If the data set is complete, the process continues to step 1020 and an optimum key is generated. At step 1022, a cyclic redundancy code (CRC) for the key is generated. Next, at step 1024, CRC for the mediametric key is stored.

Figure 11:
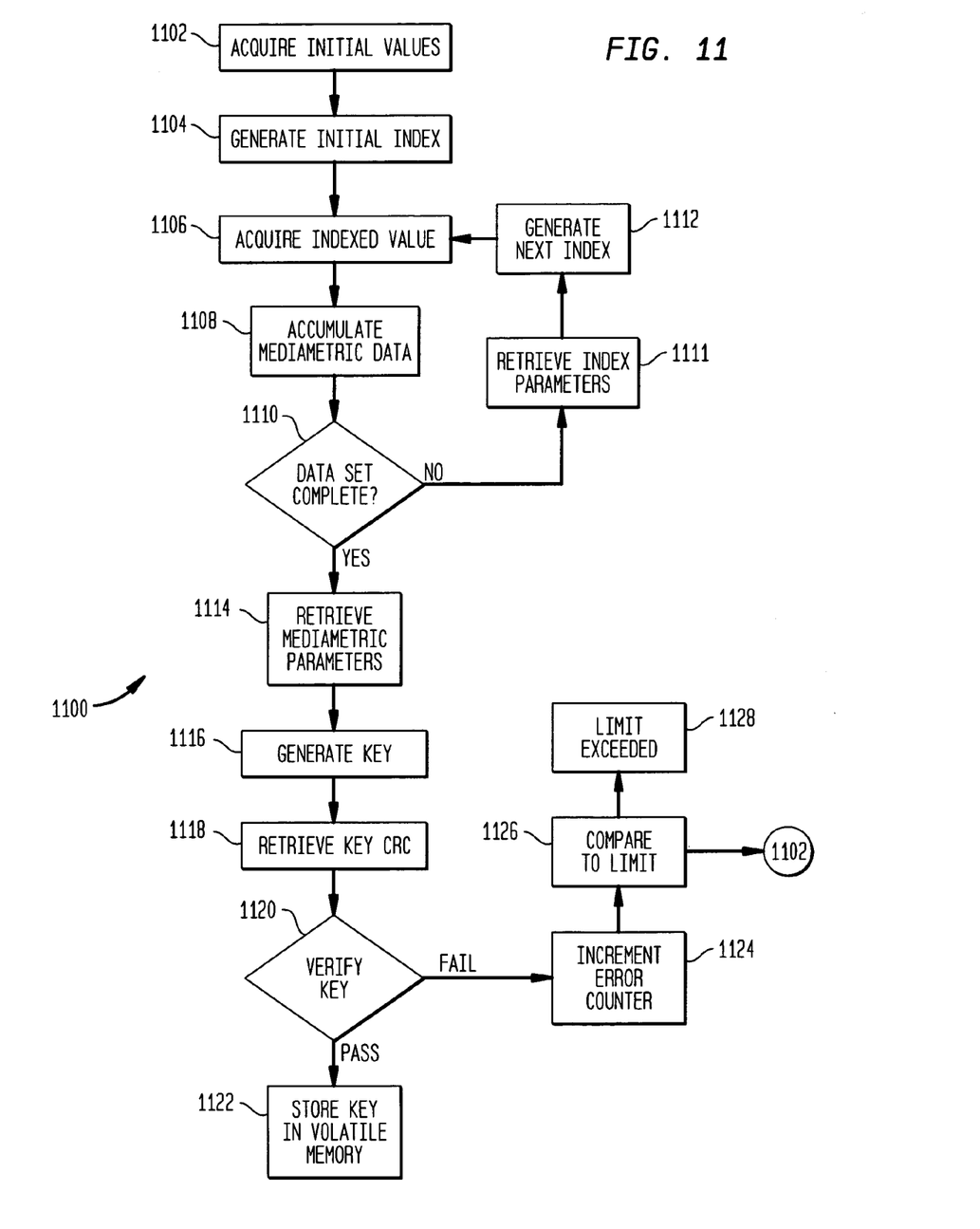
FIG. 11 illustrates a method of mediametric key generation according to an alternative embodiment of the present invention.

FIG. 11 illustrates a method 1100 of key generation according to the present invention. At step 1102, initial values are acquired. The initial values are data read from selected cells of a memory device, the cells having been previously written using an abnormally low writing voltage. At step 1104, an initial index is generated. This initial index is a location within the array from which mediametric data is to be retrieved. Next, at step 1106, the data stored at the array location indicated by the index is retrieved. Next, at step 1108, the retrieved value is accumulated with all other previously retrieved values. Next, at step 1110, a determination is made as to whether the data set is complete. If the data set is not complete, the process proceeds to step 1111 and the previously stored index parameters are retrieved. Next, at step 1112, the next index is generated. The process then returns to step 1106. If the data set is complete, the process continues to step 1114 and the accumulated data is retrieved. Next, the process proceeds to step 1116 and a key is generated using the accumulated data parameters. Next, at step 1118, the cyclic redundancy code associated with the key is retrieved. This retrieved code is the cyclic redundancy code generated for the key during the process 1000 of FIG. 10. Next, at step 1120, the key is verified using the cyclic redundancy code. If the key passes the verification, the process proceeds to step 1122 and the key is stored in a volatile memory, preferably within the data processing device. If the key does not pass verification, the process proceeds to step 1124 and an error counter is incremented. Next, at step 1126, the error counter is compared to a predetermined limit. If the limit is exceeded, the process proceeds to step 1128 and an error is reported. If the error limit is not exceeded, the process returns to step 1102 and a new attempt is made to generate a key.

Figure 12:
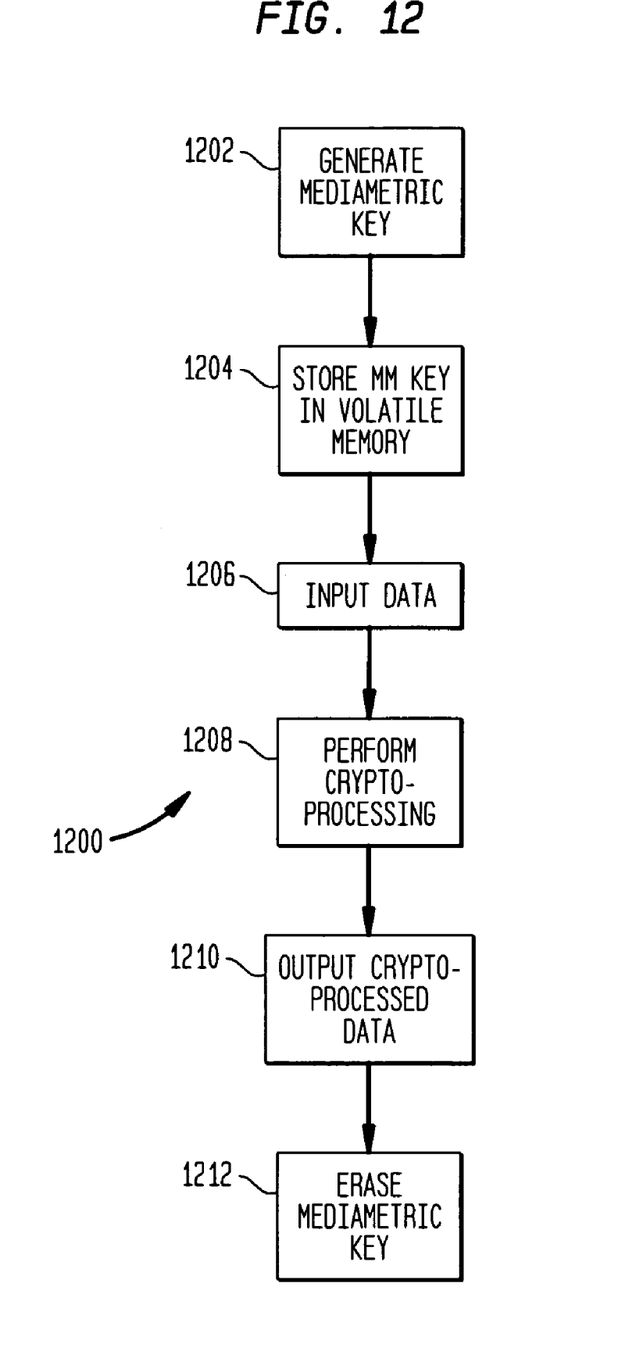
FIG. 12 illustrates a method of mediametric key cryptoprocessing according to an alternative embodiment of the present invention.

FIG. 12 illustrates a method 1200 of data encryption using a mediametric key such as the key generated by the method 1100 of FIG. 11. At step 1202, a mediametric key is generated. This may be done by performing the initialization method 1000 of FIG. 10 and the key generation method 100 of FIG. 11. Next, at step 1204, the mediametric key is stored in a volatile memory, preferably within the data processing device. Next, at step 1206, data is retrieved from an outside source. Next, at step 1208, the data is cryptoprocessed using the mediametric key generated at step 1202. Next, at step 1210, the cryptoprocessed data is output. For example, if the data has been encrypted, it may be output to a memory array for storage. An optional step 1212 follows of erasing the mediametric key from the volatile memory. Erasing the mediametric key from the volatile memory accomplishes increased security, because if the key is erased it is not subject to be discovered by attacks such as probing. However, the mediametric data which was used to generate the key, but which is not subject to be discovered by attacks, is still available to regenerate the key when needed.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A secure data storage system, comprising:
a memory possessing mediametric properties depending on specific characteristics of a particular sample of a memory device, the mediametric properties that may be possessed by the sample of the device including those created by a particular instance of a specified operation on the sample of the device, the mediametric properties of one sample of a device being different from those of other similar samples or from those created by another instance of an operation that may have created mediametric properties originally possessed by the sample, the mediametric properties being difficult to duplicate on other samples, or on the same sample by an repetition of the operation; and
a processor adapted to receive data relating to mediametric properties of the memory and use the mediametric properties as a source of data to generate an encryption key to encrypt data for storage in the memory.

2. The data storage system of claim 1, further comprising a conversion circuit to provide a numerical representation of the mediametric properties of the memory for easy use by the processor.

3. The data storage system of claim 1 wherein the memory comprises a memory array including a plurality of memory cells, each of the memory cells being program able through the application of a voltage which serves to trap charges within the memory cell, the mediametric properties of the memory being the level of trapped charges within a predetermined number of the memory cells.

4. The data storage system of claim 3 wherein the memory array includes an analog output to enable reading the levels of trapped charges, and wherein the conversion circuit includes an analog to digital converter to convert the levels of trapped charges to a digital representation.

5. The data storage system of claim 1 wherein the memory array is a parallel memory array.

6. The data storage system of claim 1 wherein the memory array is a serial memory array.

7. The data storage system of claim 1 wherein the memory array, the conversion circuit and the processor are contained in a single integrated circuit.

8. The data storage system of claim 7 wherein the integrated circuit includes a data port to provide external access to the processor.

9. The data storage system of claim 8 wherein the integrated circuit is embedded within a semiconductor memory card.

10. The data storage system of claim 9 wherein the mediametric properties are used to generate an internal key used for cryptoprocessing solely within the data storage system, and wherein the data cryptoprocessed by the internal key includes an external key to be used for cryptoprocessing of data supplied to the data storage system.

11. A method of secure data storage, comprising the steps of:
reading mediametric data relating to mediametric properties of a memory device, the mediametric properties depending on specific properties of a particular sample of the memory device, the properties that may be possessed by the sample of the device including properties created by a particular instance of a specified operation on the sample of the device, the mediametric properties of one sample of the memory device being different from those of other similar samples or from those created by another instance of an operation that may have created mediametric properties originally possessed by the sample the mediametric properties being difficult to duplicate on other samples, or on the same sample by a repetition of the operation;
processing the mediametric data to create a mediametric cryptoprocessing key for cryptoprocessing of data stored in the device; and
cryptoprocessing data for storage in the device using the mediametric key.

12. The method of claim 11 wherein the memory device is a memory array comprising a plurality of memory cells and the mediametric data comprises levels of trapped charges in a number of the memory cells.

13. The method of claim 12 wherein the mediametric data is converted to digital form for processing.

14. The method of claim 13 wherein the step of reading the mediametric data is preceded by the steps of establishing a desired key length and selecting memory cells from which mediametric data is to be read and the step of reading the data comprises sequentially reading that data from each of the selected cells and accumulating the data until data has been read from each of the selected cells.

15. The method of claim 11 wherein the mediametric cryptoprocessing key is verified using a cyclic redundancy code.

16. The method of claim 15 wherein the step of selecting memory cells from which the mediametric data is to be read is followed by the step of writing numerical data to the selected memory cells in order to establish new random mediametric data for key generation.

17. A method of mediametric key generation, comprising:
writing data to selected cells of a semiconductor memory array using an abnormally low writing voltage chosen to produce unpredictable data in the selected cells, the data produced by the use of the abnormally low writing voltage being dependent on particular characteristics of a specific sample of the semiconductor memory array prevailing at the time of writing to the array, the particular distribution of data written using the abnormally low writing voltage being at least relatively difficult to duplicate by repeating the writing process;
reading the data from the selected cells; and
processing the data from the selected cells to produce a cryptoprocessing key, the data used to create the key depending on mediametric properties specific to the particular sample of the semiconductor memory array to which the data was written and prevailing at the time of writing, the mediametric properties of one sample of the semiconductor memory array being different from those of other similar samples, and of the same sample at subsequent times.

18. The method of claim 17 wherein the step of reading the data from the selected cells is preceded by the steps of establishing a desired key length and selecting cells from which data is to be read, and the step of reading the data comprises sequentially reading that data from each of the selected cells and accumulating the data until data has been read from each of the selected cells.

19. The method of claim 18 wherein the key is verified using a cyclic redundancy code.

20. The method of claim 19 wherein the step of selecting cells from which data is to be read is followed by the step of writing numerical data to the selected cells in order to establish new random data for key generation.

21. The method of claim 20 wherein the step of reading the mediametric data comprises reading data from selected memory cells which have been written using an abnormally low writing voltage.

22. The method of claim 21 wherein the step of reading the mediametric data is preceded by the steps of establishing a desired key length and selecting cells from which mediametric data is to be read and the step of reading the data comprises sequentially reading that data from each of the selected cells and accumulating the data until data has been read from each of the selected cells.

* * * * *